(12) United States Patent
Sato et al.

(10) Patent No.: US 10,001,770 B2
(45) Date of Patent: Jun. 19, 2018

(54) PROCESSING PROGRAM GENERATION METHOD AND DEVICE

(71) Applicant: MAKINO MILLING MACHINE CO., LTD., Tokyo (JP)

(72) Inventors: Hitoshi Sato, Tokyo (JP); Yasunori Masumiya, Aiko-gun (JP); Naohito Toida, Tokyo (JP); Yuki Tanigawa, Tokyo (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 254 days.

(21) Appl. No.: 14/438,762

(22) PCT Filed: Oct. 30, 2012

(86) PCT No.: PCT/JP2012/078018
§ 371 (c)(1),
(2) Date: Apr. 27, 2015

(87) PCT Pub. No.: WO2014/068667
PCT Pub. Date: May 8, 2014

(65) Prior Publication Data
US 2015/0293524 A1    Oct. 15, 2015

(51) Int. Cl.
*G06F 19/00* (2018.01)
*G05B 19/4093* (2006.01)
*G05B 19/404* (2006.01)

(52) U.S. Cl.
CPC ....... *G05B 19/4093* (2013.01); *G05B 19/404* (2013.01); *G05B 19/40938* (2013.01);
(Continued)

(58) Field of Classification Search
USPC ........................................................ 700/181
See application file for complete search history.

(56) References Cited

U.S. PATENT DOCUMENTS 5,757,468 A * 5/1998 Patton .................. G03B 27/462
355/39
5,793,635 A * 8/1998 Niwa .................... G05B 19/406
318/570

(Continued)

FOREIGN PATENT DOCUMENTS

JP    5-8148      1/1993
JP    3099286     10/2000

(Continued)

OTHER PUBLICATIONS

International Search Report dated Jan. 29, 2013, directed towards International Application No. PCT/JP2012/078018, 2 pages.

*Primary Examiner* — Kidest Bahta
(74) *Attorney, Agent, or Firm* — Morrison & Foerster LLP

(57) ABSTRACT

A processing program generation method for generating a processing program (PR) for a work machine on the basis of use-results information for a tool (4) attached to a work machine (2), wherein the use-results information for each part of the tool (4) is obtained, a target use part of the tool (4) is set on the basis of the obtained use-results information, and the processing program (PR) is generated in a manner such that a workpiece (W) is processed using the set target use part of the tool (4).

5 Claims, 9 Drawing Sheets

(52) U.S. Cl.
CPC .............. *G05B 2219/36056* (2013.01); *G05B 2219/36103* (2013.01); *G05B 2219/36254* (2013.01); *G05B 2219/37252* (2013.01); *Y02P 90/265* (2015.11)

(56) References Cited

U.S. PATENT DOCUMENTS

| | | | | |
|---|---|---|---|---|
| 5,914,880 | A * | 6/1999 | Yasojima | G06F 19/00 700/108 |
| 6,401,004 | B1 * | 6/2002 | Yamazaki | G05B 19/40937 318/568.1 |
| 6,502,007 | B1 * | 12/2002 | Kanamoto | G05B 19/40937 700/173 |
| 6,565,497 | B1 | 5/2003 | Yamazaki et al. | |
| 6,671,571 | B1 * | 12/2003 | Matsumiya | G05B 19/401 700/172 |
| 8,180,477 | B2 * | 5/2012 | Mori | G05B 19/406 345/420 |
| 8,666,522 | B2 * | 3/2014 | Nakamura | G05B 19/4068 318/568.1 |
| 2001/0000805 | A1 * | 5/2001 | Kadono | G05B 19/4097 700/182 |
| 2004/0039484 | A1 * | 2/2004 | Watanabe | G05B 19/41825 700/245 |
| 2004/0236460 | A1 * | 11/2004 | Ould | G05B 19/408 700/181 |
| 2005/0085940 | A1 * | 4/2005 | Griggs | G05B 19/401 700/181 |
| 2007/0050079 | A1 * | 3/2007 | Itoh | G05B 19/40938 700/179 |
| 2008/0103625 | A1 * | 5/2008 | Mochida | G05B 19/4067 700/174 |

FOREIGN PATENT DOCUMENTS

| | | |
|---|---|---|
| JP | 2002-11640 | 1/2002 |
| JP | 2002-239874 | 8/2002 |
| JP | 2006-309588 | 11/2006 |
| JP | 2010-017800 | 1/2010 |
| WO | WO2004072740 A2 * | 8/2004 |

\* cited by examiner

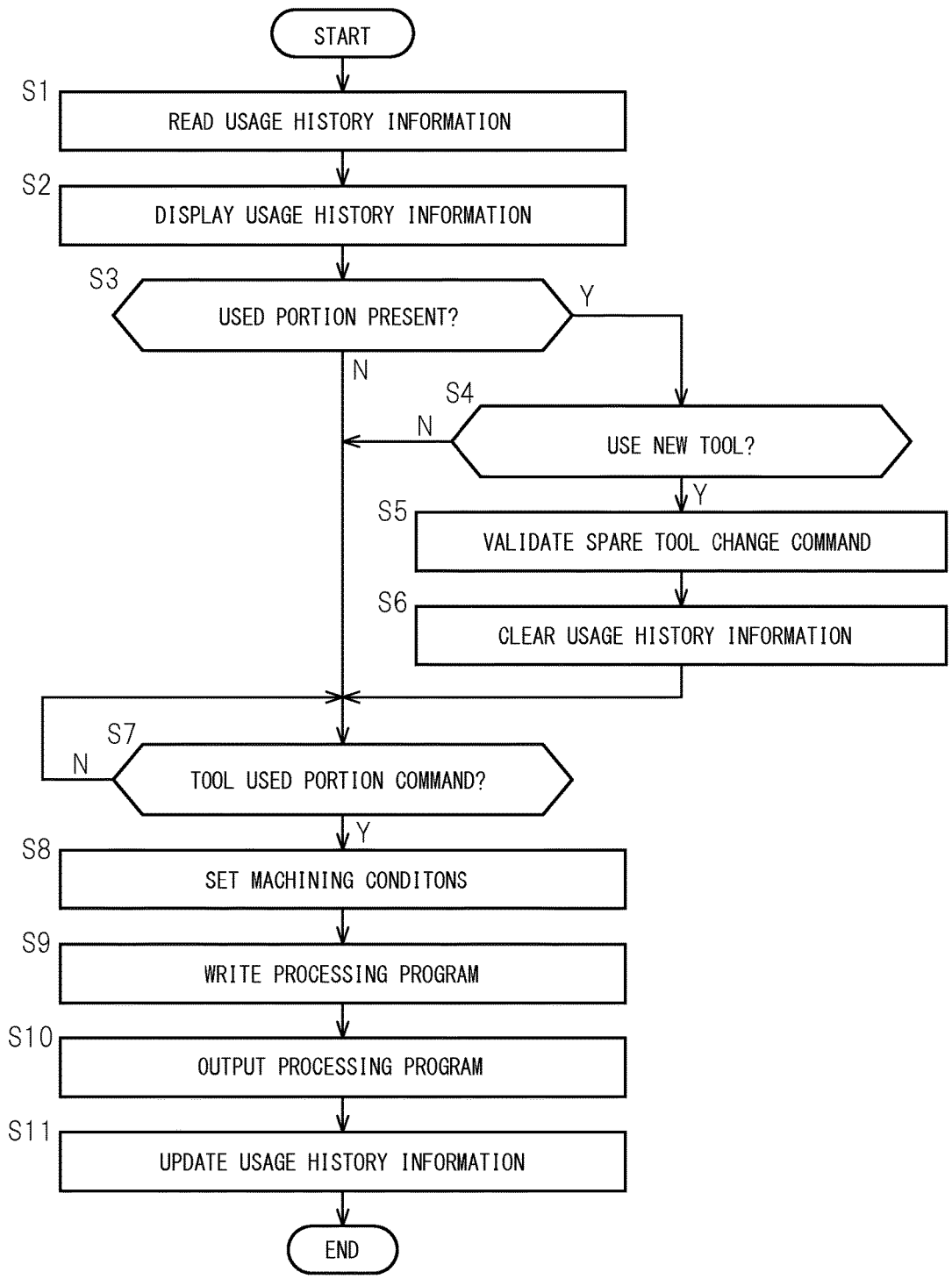

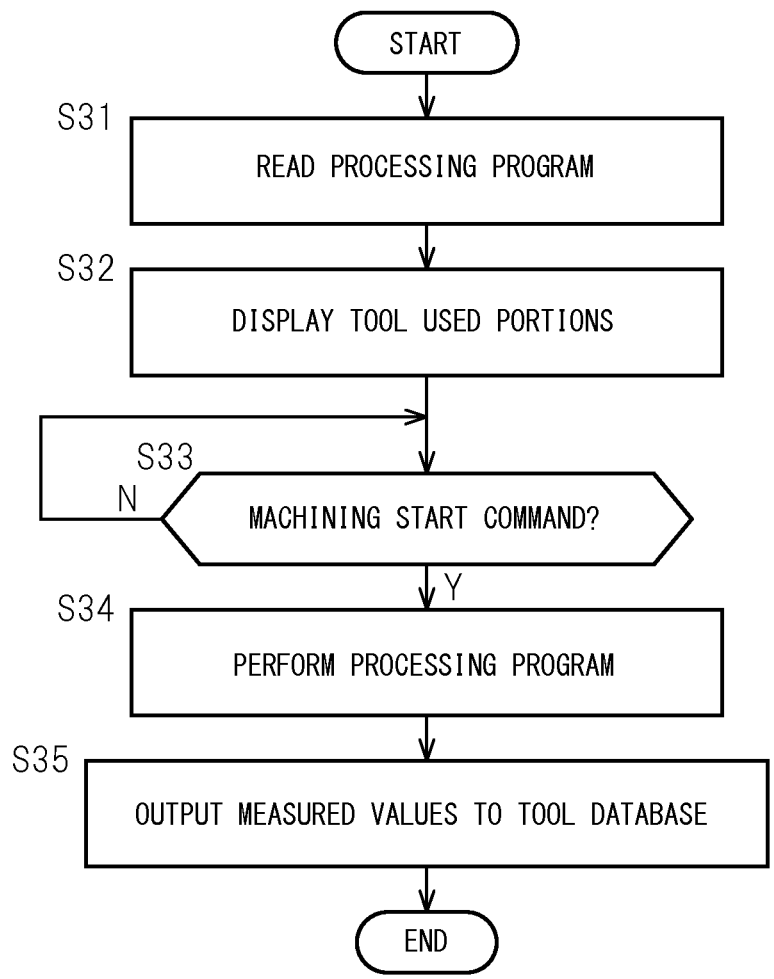

PROCESSING PROGRAM GENERATION METHOD AND DEVICE

CROSS-REFERENCE TO RELATED APPLICATIONS

This application is a U.S. National Phase patent application of International Patent Application No. PCT/JP2012/078018, filed on Oct. 30, 2012, which is hereby incorporated by reference in the present disclosure in its entirety.

FIELD OF THE INVENTION

The present invention relates to a processing program generation method and device which write a processing program of a machine tool.

BACKGROUND OF THE INVENTION

In the past, there has been known the method of control of an NC machine tool which outputs correction data corresponding to an amount of wear of a tool to a correction part of an NC device to correct a tool path (for example, see PLT 1). In the method described in this PLT 1, the cutting edge of the tool used is divided into several portions, then the spindle rotational speed, feed speed, and other machining conditions and the position command of the feed axis instructed by the processing program are used to cumulatively add the tool path length and cutting length of each portion which contacts the workpiece and find the amount of wear of each portion.

In this regard, when machining a workpiece, usually a tool is not used over its entire area. Only part is used. For this reason, even when part of a tool becomes worn and is unable to be used, sometimes portions of the tool remain which can still be used. From the viewpoint of effective utilization of a tool, it is preferable to use such portions which can still be used for machining a workpiece.

On this point, the method which is described in PLT 1 finds the amount of wear for each portion of a tool so as to correct the tool path, but no consideration is given to which portion of the tool can be utilized.

PLT 1: Japanese Patent No. 3099286

SUMMARY OF THE INVENTION

One aspect of the present invention provides a processing program generation method for generating a processing program of a machine tool based on usage history information of a tool which is attached to a machine tool, the method comprising the steps of acquiring usage history information of each portion of the tool, setting a target portion for use of the tool based on the usage history information acquired at the acquiring step, and generating the processing program so as to machine a workpiece by using the target portion for use of the tool set at the setting step.

Another aspect of the present invention provides a processing program generation device for generating a processing program of a machine tool based on usage history information of a tool which is attached to a machine tool, the device comprising: an information acquisition part which acquires usage history information of each portion of the tool, a display unit which displays usage history information of each portion of the tool acquired at the information acquisition part, an input unit to which a target portion for use of the tool is input, and a program generating part which writes the processing program so as to machine a workpiece by using the target portion for use of the tool input at the input unit.

Further, another aspect of the present invention provides a processing program generation device for generating a processing program of a machine tool based on usage history information of a tool which is attached to a machine tool, the device comprising: an information acquisition part which acquires usage history information of each portion of the tool, a setting part which set a target portion for use of the tool by using usage history information acquired at the information acquisition part, and a program generating part which writes the processing program so as to machine a workpiece by using the target portion for use of the tool set at the setting part.

BRIEF DESCRIPTION OF THE DRAWINGS

FIG. 6 is a flow chart which shows one example of processing which is performed by the CAM device of FIG. 1.

FIG. 7 is a flow chart which shows one example of processing which is performed by the NC device of FIG. 1.

DETAILED DESCRIPTION OF THE INVENTION

Figure 1:
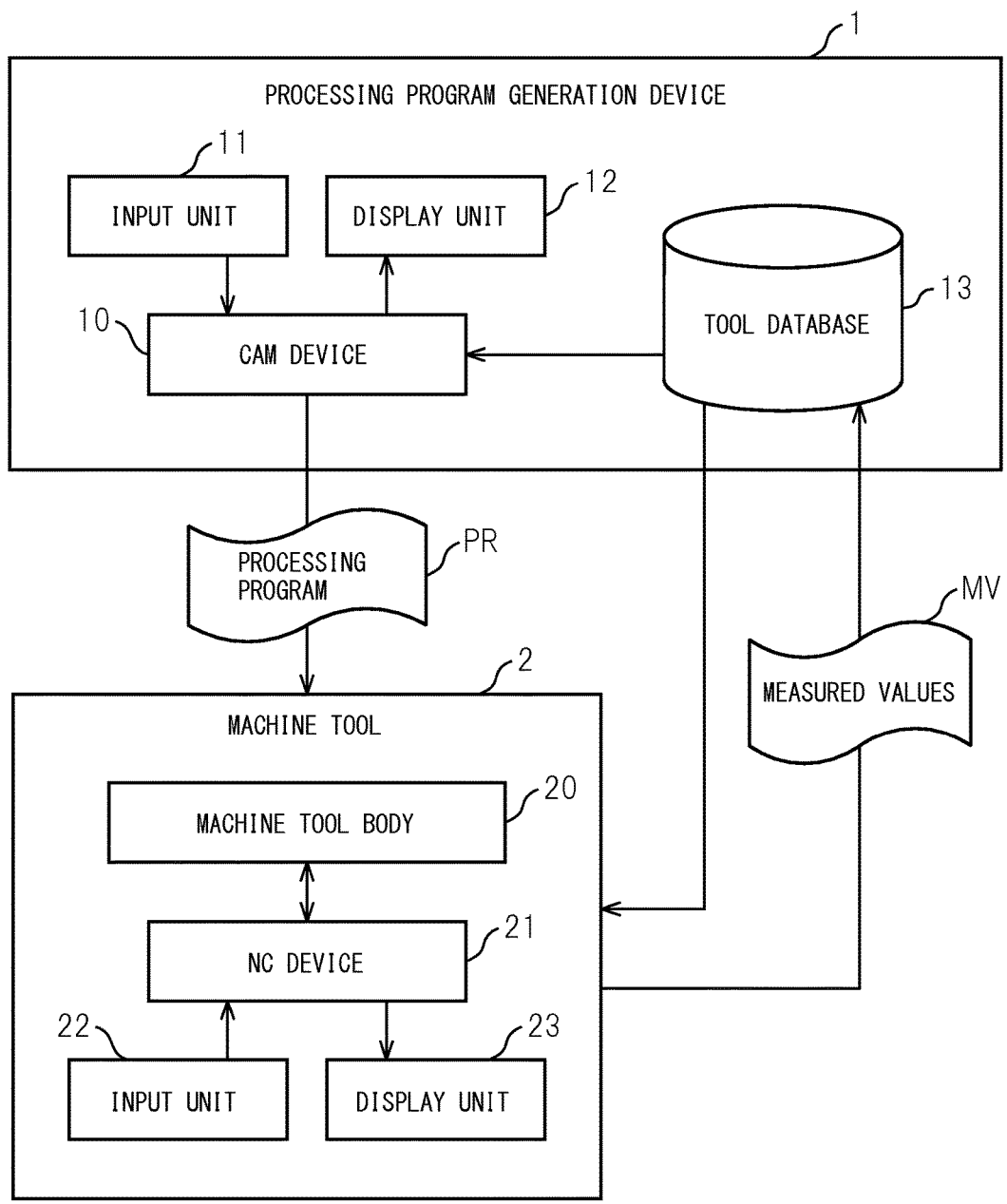
FIG. 1 is a block diagram which shows the schematic configuration of a workpiece machining system to which the processing program generation method according to one embodiment of the present invention is applied.

Below, referring to FIG. 1 to FIG. 9, an embodiment of the processing program generation method according to the present invention will be explained. FIG. 1 is a block diagram which shows the schematic configuration of a workpiece machining system to which the processing program generation method according to the embodiment of the present invention is applied.

As shown in FIG. 1, the workpiece machining system has a processing program generation device 1 which writes a processing program PR and a machine tool 2 which operates in accordance with a processing program PR which is written by the processing program generation device 1 so as to machine the workpiece. The processing program generation device 1 is arranged at a location away from the machine tool 2, for example, is arranged at the outside of a factory. The processing program generation device 1 and the machine tool 2 are connected by a LAN. The machine tool 2 has a machine tool body 20, an NC device 21 which controls the operation of the machine tool body 20, and an input unit 22 and display unit 23 which are connected with the NC device 21.

Figure 2:
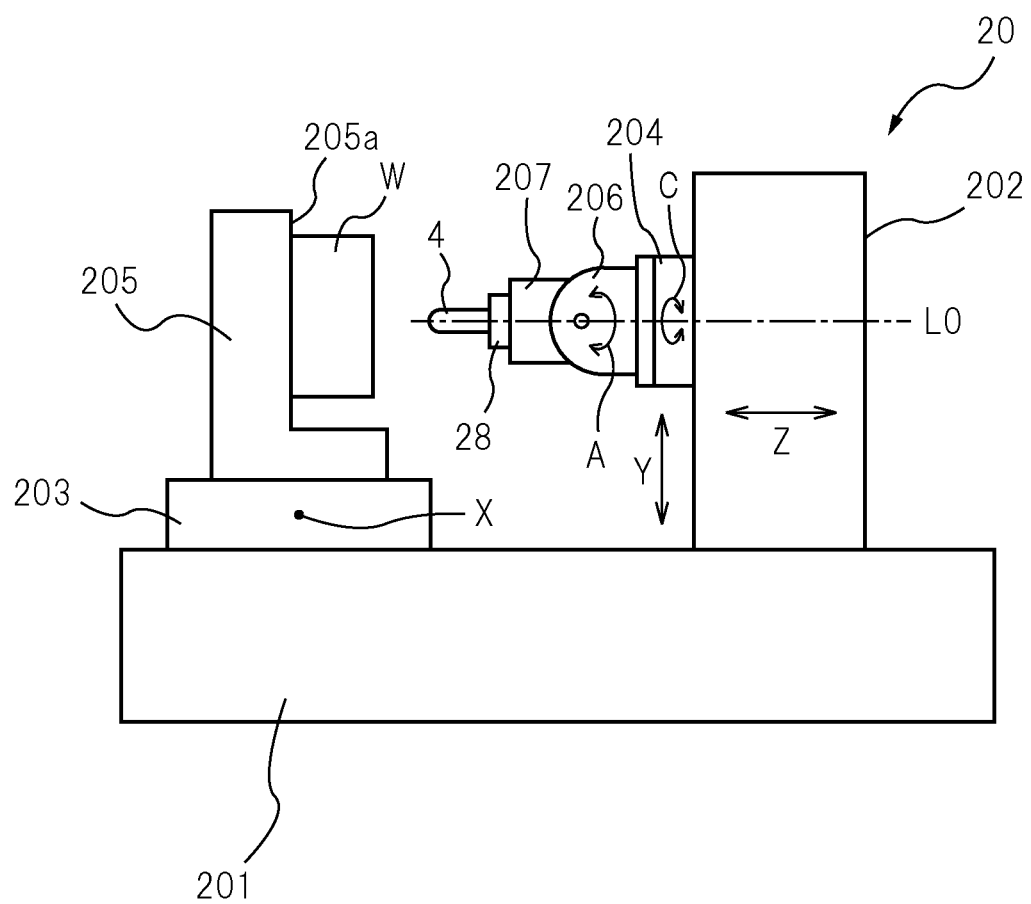
FIG. 2 is a view which shows one example of a machine tool body of FIG. 1.

FIG. 2 is a view which shows one example of a machine tool body 20. The machine tool body 20 of FIG. 2 is a five-axis horizontal machining center where a tool 4 extends along the axial line in the horizontal direction. Below, as illustrated, the direction parallel to the axial line L0 is defined as the Z-axial direction (front-back direction), the direction vertical to the horizontal direction and Z-axial direction is defined as the X-axial direction (left-right direction), and the vertical direction is defined at the Y-axial direction (up-down direction).

As shown in FIG. 2, the machine tool body 20 has a bed 201 which is fastened to the floor, a column 202 which is provided standing on the top surface of the bed 201 to be able to move in the horizontal direction (Z-axial direction), a table 203 which is provided in front of the column 202 to be able to move on the top surface of the bed 201 in the horizontal direction (X-axial direction), and a spindle table 204 which is provided on the front surface of the column 202 to be able to move in the up-down direction (Y-axial direction). On the top surface of the table 203, a right angle plate 205 is attached. At the back surface of the right angle plate 205, that is, a workpiece mounting surface 205a, a workpiece W is fastened.

At the spindle table 204, a swivel base 206 which can rotate about a rotational feed axis (C-axis) centered about the Z-axis is attached. The swivel base 206 has a pair of arm parts which are arranged separated from each other in the left-right direction. Between the pair of arm parts, a spindle head 207 is supported to be able to rotate about a rotational feed axis (A-axis) vertical to the C-axis. The spindle head 207 supports the spindle 208 to be able to rotate. At the front end part of the spindle 208, the tool 4 is attached. The tool 4 is for example a ball end mill with a semispherical front end part. Note that, while the illustration is omitted, the machine tool body 20 has an automatic tool changer. It is possible automatically detach the tool 4 from the spindle 208 and store it in the tool magazine and to automatically detach a desired tool 4 from the tool magazine and attach it to the spindle 208.

The table 203, spindle table 204, and column 202 move by respective linear feed mechanisms in the X-axial direction, Y-axial direction, and Z-axial direction. The linear feed mechanisms are, for example, comprised of ball screws, servo motors which drive rotation of the ball screws (X-axis use servo motor, Y-axis use servo motor, and Z-axis use servo motor), etc. The spindle head 207 and swivel base 206 respectively rotate about the A-axis and C-axis by drive operation of the servo motors (A-axis use servo motor and C-axis use servo motor). Due to this, the workpiece W moves relative to the tool 4 and machines the workpiece W with the tool 4 in a desired machining posture. Note that, the respective servo motors have position detectors and can use the signals from the position detectors to detect the relative position and posture of the tool 4 with respect to the workpiece W.

Figure 3A:
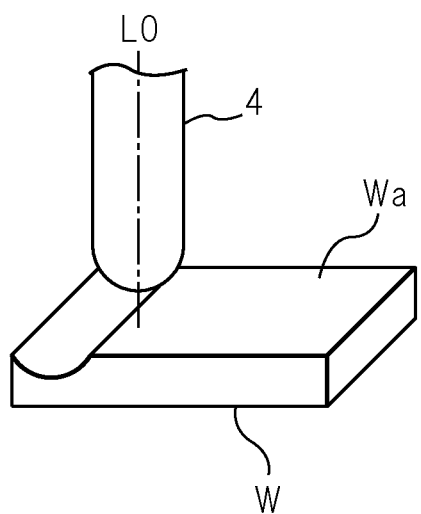
FIG. 3A is a view which shows one example of a machining posture of a tool with respect to a workpiece.
Figure 3B:
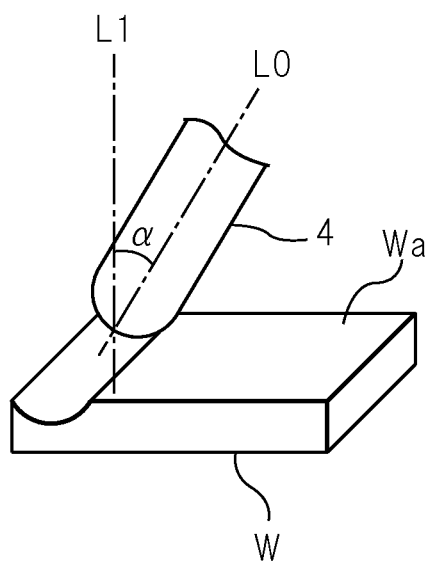
FIG. 3B is a view which shows a machining posture of a tool different from FIG. 3A.
Figure 4:
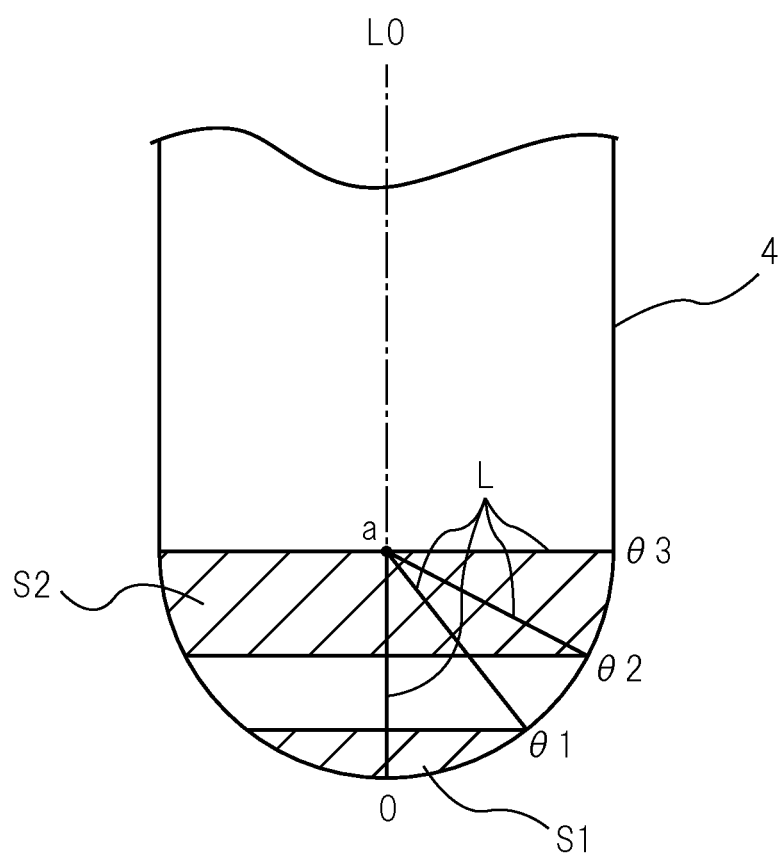
FIG. 4 is an enlarged view of a front end part of a tool.

FIG. 3A and FIG. 3B are views which show the machining postures of the tool 4 with respect to the workpiece W, while FIG. 4 is an enlarged view of the front end part of the tool. The tool 4 is a ball end mill. As shown in FIG. 4, the front end part of the tool forms a semispherical shape about a point "a". A used portion of the tool 4 can be expressed by an angle $\theta$ with respect to the axial line L0, that is, an angle $\theta$ which is formed between a line segment L which connects the center point "a" and the used portion of the tool surface and the axial line L0. This used portion has a certain range. The range of the used portion can be expressed by a range of the angle $\theta$ with respect to the axial line L0 (start angle and end angle).

A used portion of the tool 4 (range of angle $\theta$) is determined in accordance with the machining posture of the tool 4 (relative posture with respect to the workpiece W). For example, as shown in FIG. 3A, in the machining posture where the axial line L0 of the tool 4 is vertical to the workpiece machining surface Wa, the $0 \leq \theta \leq \theta 1$ region S1 at the outer circumferential surface of the front end part of the tool becomes the used portion of the tool 4. At this time, the start angle is 0°, while the end angle is $\theta 1$ (for example 30°). On the other hand, as shown in FIG. 3B, in the machining posture where the axial line L0 of the tool 4 is inclined by exactly a predetermined angle $\alpha$ from the axial line L1 vertical to the workpiece machining surface Wa, the $\theta 2 \leq \theta \leq \theta 3$ region S2 at the outer circumferential surface of the front end part of the tool becomes the used portion of the tool 4. At this time, the start angle is $\theta 2$ (for example 60°), while the end angle is $\theta 3$ (for example 90°). Note that, the angles $\theta 1$ to $\theta 3$ which show the used portion of the tool 4 change not only due to the angle $\alpha$ of the tool axial line L0 with respect to the axial line L1, but also due to the depth of machining of the tool 4. The machining posture of the tool 4 is determined by the angle $\alpha$ and the depth of machining.

In this way, the tool 4 is not used over its entire area when machining a workpiece. Normally, only part is used. The amount of wear of the tool 4 differs for each portion. Therefore, even if a specific portion of the tool 4 is worn after machining the workpiece and that portion can no longer be used, sometimes an unused or still usable portion will remain at the tool 4. From the viewpoint of effectively utilizing the tool 4, it is preferable to utilize the unused or still usable portion for machining the workpiece. Therefore, in the present embodiment, the processing program generation device 1 is configured in the following way, information of what portions of the tool 4 have been used to what extent (usage history information) is obtained, and this usage history information is used as the basis to write the processing program PR of the machine tool 2.

As shown in FIG. 1, the processing program generation device 1 has a CAM device 10, input unit 11, display unit 12, and tool database 13. The CAM device 10 reads CAD data corresponding to the workpiece shape from a not shown CAD device and uses this CAD data to prepare a processing program PR. The processing program PR includes a tool path and machining posture of the tool 4. The machining posture is determined in accordance with the used portion of the tool 4. The machining posture of the tool 4 is determined by inputting a range of angle $\theta$ at which the user should use the tool 4 (called the target usage angle) through the input unit 11.

The tool database 13 fetches measured values MV which express the state of use of the tool 4 which are actually measured by the machine tool 2 as the tool usage history path. The measured values MV include the machining posture, machining time, machining speed, machining distance, etc. of the tool 4 which are detected by the position detectors of the servo motors. The tool database 13 uses the measured values MV which express the machining posture of the tool 4 as the basis to calculate a used portion of the tool 4 (angle $\theta$ with respect to axial line L0), calculates a physical quantity which expresses the state of use of the tool 4 (for example, the usage time), and stores a physical quantity which expresses the state of use linked with the used portion of the tool 4 as the usage history information. That is, the measured values MV from the machine tool 2 are not stored as they are as the usage history information. A physical quantity which expresses a used portion of the tool 4 and the state of use of the tool 4 is found from the measured values MV and stored as the usage history information of the tool 4. The usage history information which is stored in the tool database 13 is updated each time a workpiece W finishes being machined. Note that, the tool database 13 also stores usage history information of a new tool 4. The usage history information in this case is information that there is no used portion.

The usage history information which is stored in the tool database 13 is fetched by the CAM device 10 and displayed at the display unit 12 of the processing program generation device 1. Note that, it is also possible for the usage history information which is stored in the tool database 13 to be read by the machine tool 2 and to be displayed at the display unit 23 of the machine tool 2.

Figure 5:
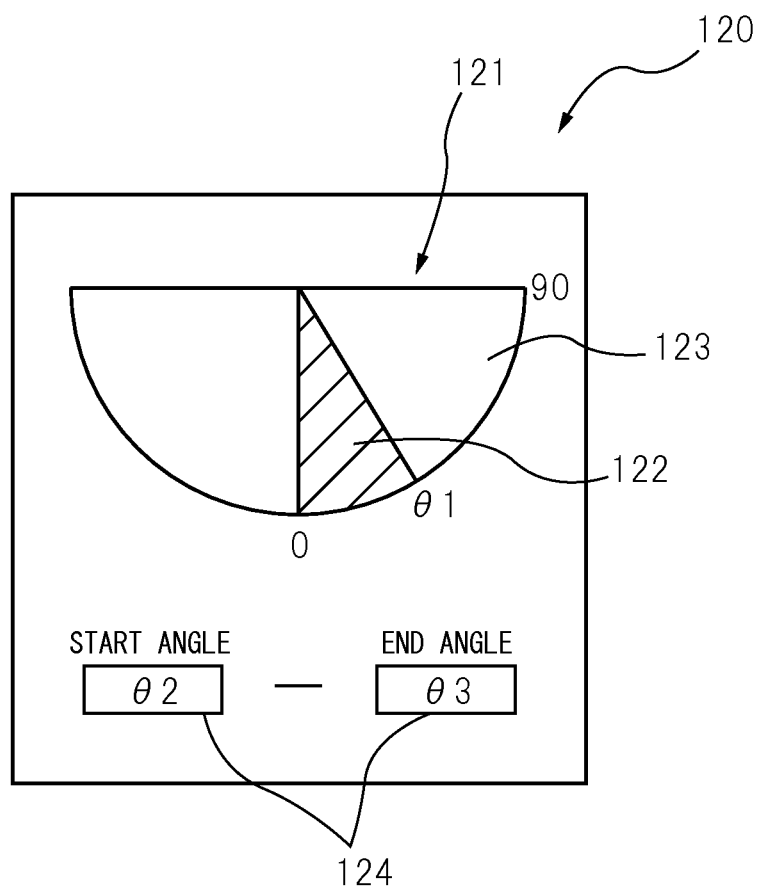
FIG. 5 is a view which shows one example of a display screen which is shown at a display unit of a processing program generation device of FIG. 1.

FIG. 5 is a view which shows one example of a display screen 120 which is displayed at the display unit 12 of the processing program generation device 1. This figure shows the display screen after the workpiece W is machined by the machining posture of FIG. 3A. As shown in FIG. 5, the display screen 120 displays a semicircular shape tool image 121 which expresses the front end part of the tool 4 and displays a used portion image 122 which expresses the used portion (range of angle θ) of the tool 4 superposed on the tool image 121 in a fan shape. The display screen 120 displays a range of angle θ by a numerical value corresponding to the used portion image 122. In the example of FIG. 5, the range of angle of the used portion is 0° to θ1. In FIG. 5, the region of the range of angle θ1 to 90° is an unused portion image 123 which expresses an unused portion of the tool 4.

The used portion image 122 and the unused portion image 123 are displayed by mutually different display modes (for example different colors). Due to this, the user can easily recognize the used portion of the tool 4. Note that, the used portion and the unused portion of the tool 4 may not only be displayed by color coding, but may also be displayed together with information on the extent of use of the used portion. For example, the longer the usage time at the used portion of the tool 4, the deeper the displayed color of the used portion image 122 may be made.

If the user refers to the display screen 120 to check the used portion of the tool 4, the user inputs the target usage angle θ (target start angle and target end angle) of the tool 4 through the input unit 11. The display screen 120 is provided with a target angle display part 124, while the target angle display part 124 displays the input range of the target usage angle θ. In the example of FIG. 5, the target start angle is θ2, while the target end angle is θ3.

Next, the processing which is performed by the CAM device 10 of the processing program generation device 1 according to the present embodiment will be explained. FIG. 6 is a flow chart which shows one example of the processing which is performed at the CAM device 10. The processing which is shown in this flow chart is started when the user selects the tool 4 to be used through the input unit 11. Each tool 4 is assigned a tool no. for identifying the tool 4. The tool 4 is selected by designation of the tool no.

At step S1, the usage history information which corresponds to the selected tool 4 is read from the tool database 13. At step S2, as shown in FIG. 5, the read usage history information is displayed at the display unit 12. At step S3, it is judged if there is a used portion of the tool 4, that is, if the selected tool 4 is a new one. If the judgment at step S3 is affirmative, that is, if it is judged that the tool 4 has already been used, the step proceeds to step S4, while if the judgment at step S3 is negative, the step proceeds to step S7.

At step S4, it is judged whether to use a new tool 4. This judgment is judgment as to if the user has instructed selection of a new tool 4 through the input unit 11. For example, the input unit 11 is provided with a new tool selection switch which instructs the selection of a new tool 4 and a cancel switch which instructs non-selection of a new tool 4. The user views usage history information which is displayed at the display unit 12 while judging whether to use a new tool 4 instead of the initially selected tool 4, operates the new tool selection switch if judging to use a new tool, and operates the cancel switch if judging not to use a new tool. If the new tool selection switch is operated, the judgment at step S4 is affirmative and the step proceeds to step S5, while if the cancel switch is operated, the judgment at step S4 is negative and the step proceeds to step S7.

At step S5, a command for change to a spare tool is validated. A "spare tool" is a new tool for replacement use which is allocated in advance for each tool 4. The processing program is written so that by validating the command for change to a spare tool, at the later explained processing (step S9), a predetermined spare tool (new tool) is selected instead of the tool 4 to which the initial tool no. is allocated. Next, at step S6, the usage history information which corresponds to the tool no. of the initially selected tool 4 is cleared. That is, a new spare tool is allocated for the tool no. of the initially selected tool 4, so at step S6, the usage history information of the past used tool 4 is cleared.

At step S7, it is judged if the user has instructed a target portion for use of the tool 4 (range of angle θ). Step S7 is repeated until the user operates the input unit 11 to input the target start angle and the target end angle. When it is judged at step S7 that the target portion for use is instructed, the routine proceeds to step S8 where the machining conditions corresponding to the tool 4 used are set. The machining conditions are the grade, shape, and other tool information of the tool 4. The machining conditions are stored in advance in the tool database 13. The machining conditions are read and set from the tool database 13.

At step S9, the processing program PR is written based on the shape of the workpiece, the target portion for use of the tool 4, the machining conditions, etc. so as to machine the workpiece W using the target portion for use of the tool 4 which is instructed by the user. At this time, if the spare tool change command is validated at step S5, a command for selection of a spare tool by the automatic tool changer is included in the processing program PR. Next, at step S10, the processing program PR is output to the NC device 21 of the machine tool 2.

Finally, the target portion for use of the tool 4 is used as the basis to update the usage history information of the tool 4 in the tool database 13. That is, the usage history information is updated provisionally assuming that the target portion for use of the tool 4 has been used for machining the workpiece. This updating here is provisional updating. The main updating of the tool database 13 is performed based on the measured values MV which express the state of use of each tool 4 which is output from the machine 2 after the workpiece W finishes being machined. The reason for provisionally updating the tool database 13 at step S11 is consideration that sometimes the next processing program PR is written after outputting the processing program PR at step S10 and before the workpiece W finishes being machined by the machine tool 2. That is, in this case, if the usage history information is not updated, the target portion for use of the tool 4 is treated as unused regardless of it having been used and the used portion of the tool 4 in the next machining is liable to be mistakenly instructed.

Next, the processing performed by the NC device 21 of the machine tool will be explained. FIG. 7 is a flow chart which shows one example of the processing performed by the NC device 21. The processing which is shown in this flow chart, for example, is started when the power of the NC device 21 is turned on.

At step S31, the processing program PR is read from the processing program generation device 1. At step S32, the usage history information of the tool 4 which is stored in the tool database 13 is used as the basis to display the used portion of a predetermined tool 4 which is used by performing the processing program PR on the display unit 23 of the machine tool 2. Before making the machine tool 2 operate, the user performs confirmation work where the user visually checks if the tool 4 to be used is attached to the machine tool 2 (tool magazine etc.), if there is an effective cutting edge at the used portion of the tool 4, etc. By performing this confirmation work while referring to the display at the display unit 23, it is possible to easily and accurately perform the confirmation work.

At step S33, it is judged if the input unit 22 is operated to instruct the start of machining of the workpiece W. This judgment is, for example, judgment as to if the start switch which is provided at the input unit 22 has been turned on. The start switch is turned on when the user finishes a series of confirmation work. At step S34, the NC device 21 performs the processing program PR. Due to this, the machine tool body 20 operates in accordance with the processing program PR and machines the workpiece W. During machining of the workpiece, the display unit 23 displays information which shows the state of progress of machining etc. If the processing program PR has finished being performed, the routine proceeds to step S35.

At step S35, the measured values MV which show the state of use of each tool 4 which are actually measured at the machine tool 2 when machining the workpiece (machining posture, machining time, machining speed, machining distance, etc. of tool 4) are output to the tool database 13. Due to this, the usage history information of the tool 4 in the tool database 13 is updated (main updating). At this time, the display unit 23 of the machine tool 2 displays the usage history information of the tool 4 by a mode of display similar to, for example, FIG. 5. Due to this, the user can easily recognize the state of use of the tool 4 after machining the workpiece.

If summarizing the operation of the above embodiment, the following can be said: When the user of the CAM device 10 writes a processing program PR of the NC device 21, first, the user selects the tool 4 to be used through the input unit 11. The CAM device 21 acquires the usage history information of the selected tool 4 from the tool database 13 and, for example, displays the usage history information on the display unit 12 by a mode of display such as shown in FIG. 5 (step S1 and step S2). The user refers to the display screen 120 of the display unit 12 and sets the target portion for use of the tool 4 through the input unit 11. For example, when precision machining a workpiece W, an unused portion of the tool 4 is set as the target portion for use. When rough machining a workpiece W, an already used portion of the tool 4 is set as the target portion for use.

The settings of the target portion for use (target start angle and target end angle) are displayed at the input value display part 124. When the user refers to the display part and judges that the selected tool 4 has no suitable target portion for use, the user operates the new tool selection switch and selects a new tool 4. At this time, the spare tool change command is validated (step S5), and the usage history information of the tool 4 is cleared (step S6). If the target portion for use of the tool 4 is instructed through the input unit 11, the CAM device 10 writes a processing program PR to machine the workpiece W by using that target portion for use (step S9) and outputs it to the NC device 21 (step S10).

The NC device 21 reads the processing program PR (step S31) and makes the machine tool body 20 operate in accordance with the processing program PR to machine the workpiece W (step S34). Due to this, when part of the tool 4 cannot be used due to wear etc., if there is a portion which can be used in the remaining portion of the tool 4, that portion which can be used can be utilized to machine the workpiece W, and the tool 4 can be effectively utilized. After machining the workpiece, measured values MV which show the state of use of the tool 4 which is acquired at the time of machining the workpiece are output to the tool database 13 (step S35). Due to this, the tool usage history information of the tool database 13 is updated.

According to the present embodiment, the following operation and effects can be exhibited.

(1) The processing program generation method according to the present embodiment acquires the usage history information of each portion of the tool 4 from the machine tool 2 through the tool database 13 (acquisition step), uses the acquired usage history information as the basis for the user to input the target portion for use so that the CAM device 10 writes a processing program PR so as to set the target portion for use of the tool 4 (setting step), and uses the set target portion for use of the tool 4 to machine the workpiece W (writing step). Due to this, when a portion of the tool 4 which can be used remains, it is possible to use that portion which can be used to machine the workpiece W and possible to effectively utilize the tool 4. As a result, the cost of the tool 4 can be reduced.

(2) The usage history information of each portion of the tool 4 which is acquired through the tool database 13 is displayed at the display unit 12 (display step), so the user can refer to the display of the display unit 12 to confirm the state of use of the tool 4. Setting of the target portion for use of the tool 4 becomes easy.

(3) The display unit 12 displays a used portion and unused portion of the tool 4 by different modes of display, so it is possible to easily select and set the target portion for use from unused portions of the tool 4 and evenly use the entire area of the tool 4.

The above embodiment acquires usage history information of each portion of the tool 4 through the tool database 13, displays that usage history information at the display unit 12, and has the user manually input the target portion for use through the input unit 11 so as to set the target portion for use, but rather than manually setting the target portion for use, it is also possible to automatically set it by the CAM device 10 which functions as the setting part.

In this case, the priority order of the used portions of the tool 4 may be determined in advance and recorded in tool database 13 and that priority order may be followed to automatically set the target portion for use instead of step S3 to step S7 of FIG. 6. The priority order can for example be set by giving various conditions such as priority use of a not-new tool 4, preferential use of not an unused part but a used part of a tool 4 when performing rough machining, etc. The automatically set target portion for use may be displayed once as a provisional target portion for use on the display unit 12, then the user may input a decision command to finally set the target portion for use. In this case, when no decision command is input, the conditions may be changed and the target portion for use may be set again. Due to this, the trouble of input of the target portion for use by the user itself is eliminated and the target portion for use is easily set.

In the above embodiment, the tool database 13 acquires measured values MV from the machine tool 2 as usage history information and finds the used portion, usage time, etc. of the tool 4 from that measured values MV, but it is also possible to find the used portion, usage time, etc. of a tool 4 from the measured values MV at the machine tool side (for example NC device 21) and can output these as usage history information to the tool database 13. The CAM device 10 is designed to acquire the usage history information through the tool database 13, but may also be made to acquire the usage history information from the machine tool 2 without going through the tool database 13. The information acquisition part is not limited in configuration to the one explained above.

In the above embodiment, signals from position detectors etc. attached to the servo motors of the machine tool body 20 are output as the measured values MV to the tool database 13, but other detection signals may also be output so long as able to specify a used portion of the tool 4. For example, it is also possible to attach a CCD camera to the machine tool body 20 and make the tool 4 rotate while photographing the front end part of the tool 4 by the CCD camera to measure the dimensions and output the measured dimensions to the tool database 13.

When manually setting the target portion for use of the tool 4, the user inputs the target portion for use through the input unit 11, while when automatically setting it, the setting part (CAM device 10) automatically sets the target portion for use, but so long as generating the processing program PR by using the target portion for use of the tool 4 to machine the workpiece W, the CAM device 10 which functions as the program generating part may be configured in any way.

Figure 8A:
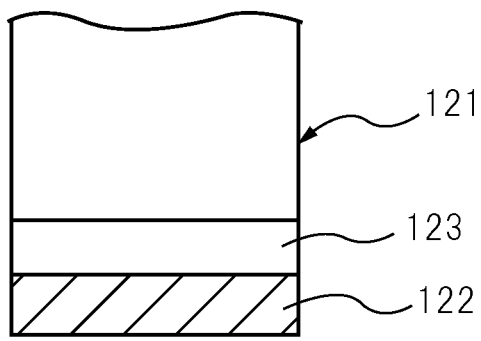
FIG. 8A is a view which shows a modification of FIG. 5.
Figure 8B:
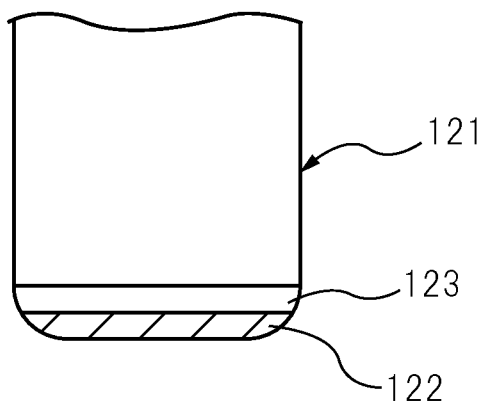
FIG. 8B is a view which shows a modification of FIG. 5.

In the above embodiment, a ball end mill is used as the tool 4 which is attached to the machine tool 2, but the present invention can be similarly applied to the case of use of a flat end mill, bull nose, or other tool 4. Therefore, the target portion for use of the tool 4 may be instructed by a parameter other than the angle θ, while a used portion of the tool 4 can be displayed at the display unit 12 using a parameter other than the angle θ. FIG. 8A and FIG. 8B are views which show an example of the tool image 121, the used portion image 122, and the unused portion image 123 which are displayed at the display unit 12 when applying the present invention to a flat end mill and bull nose end mill. In FIG. 8A and FIG. 8B, for example, it is possible to input the distance from the front end part of the tool (start distance and end distance) to instruct the target portion for use.

Figure 9:
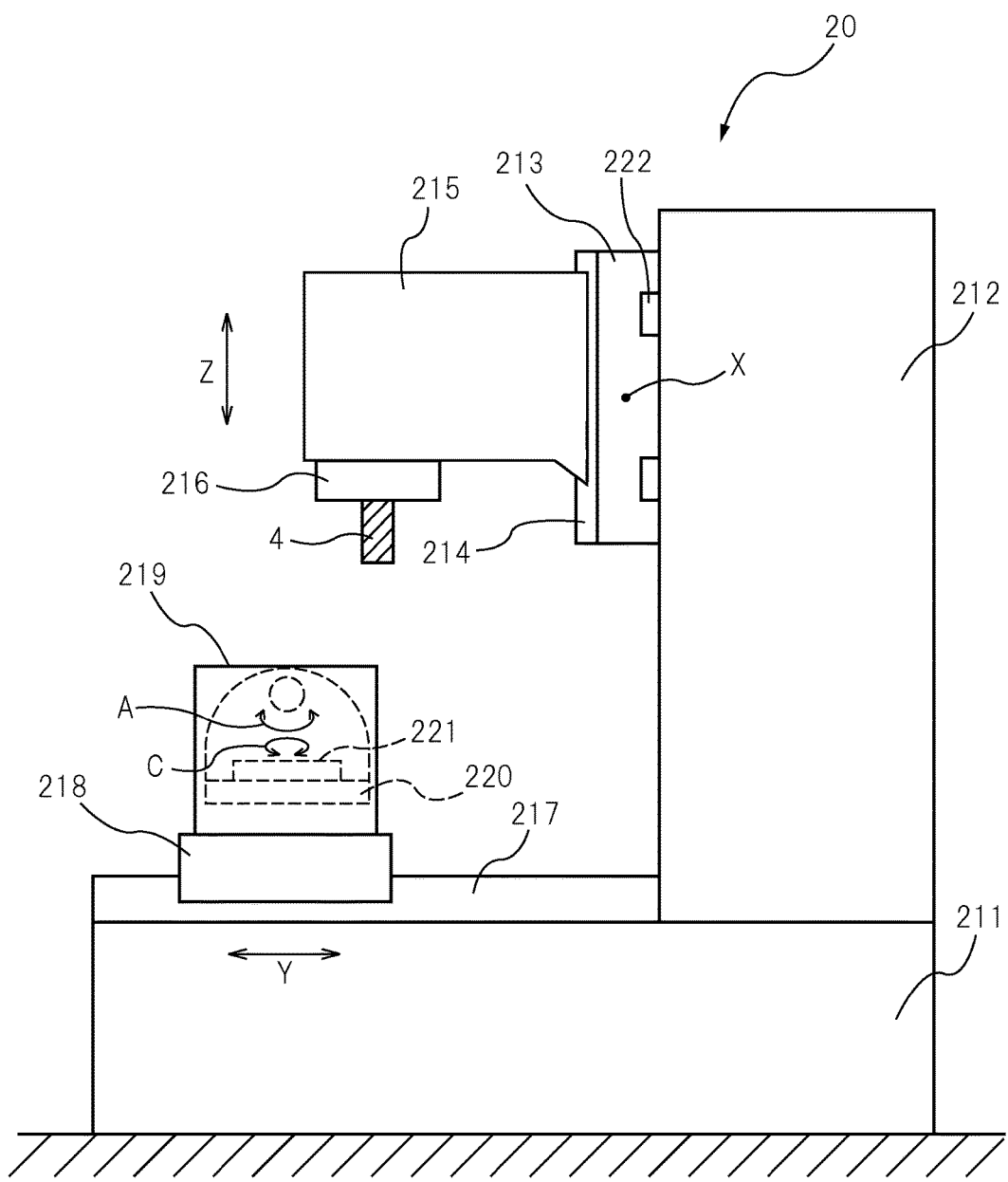
FIG. 9 is a view which shows a modification of FIG. 2.

In the above embodiment, a horizontal machining center is used as the machine tool body 20, but the present invention can similarly be applied to a vertical machining center or other machine tool body 20 which is shown in FIG. 9. The machine tool body 20 of FIG. 9 is provided with a bed 211, a column 212 which is provided standing on the bed 211, a spindle table 213 which can move along the X-axial direction along a guide rail 222 which is provided on the column 212, a spindle head 215 which can move in the X-axial direction along a guide rail 214 which is provided on the spindle table 213, and a spindle 216 which is supported at the spindle head 215 to be able to rotate and has a tool 4 attached to it. The bed 211 is provided with a saddle 218 which can move along the guide rail 217 in the Y-axial direction. On the saddle 218, a trunnion 219 which has a pair of side walls which are separated from each other in the X-axial direction is fastened. Between the pair of side walls, a table swivel base 220 is provided to be able to rotate about a rotational feed axis (A-axis) centered on the X-axis. On the table swivel base 220, a table 221 is attached which can rotate about a rotational feed axis (C-axis) centered on the Z-axis. The workpiece W is fastened on the table 221.

The above explanation is only one example. The above embodiment and modifications do not limit the present invention so far as the features of the present invention are not impaired. The component elements of the embodiment and modifications include elements which can be replaced with them and are self evidently replaced with them while maintaining unity of invention. That is, other conceivable aspects in the scope of the technical concept of the present invention are also included in the scope of the present invention. Further, it is possible to combine the above embodiment and one or more of the modifications in any way.

According to the present invention, a processing program is written so as to acquire usage history information of each portion of a tool, use the acquired usage history information as the basis to set a target portion for use of the tool, and use the set target portion for use to machine the workpiece. For this reason, it is possible to efficiently use a portion of the tool which has not yet been used or which can still be used and therefore the tool can be effectively utilized.

1. processing program generation device
2. machine tool
10. CAM device
11. input unit
12. display unit
13. tool database
20. machine tool body
21. NC device
PR. processing program

The invention claimed is:

1. A processing program generation method for generating a processing program of a machine tool based on usage history information of a milling cutter which is attached to the machine tool, the method comprising the steps of:
acquiring usage history information of each portion of the milling cutter, the usage history information defining a used part of the milling cutter and being represented as a distance from a front end face of the milling cutter or a range of angles from an axial line of the milling cutter;
inputting a target portion for use of the milling cutter by referring to the usage history information acquired at the acquiring step;
generating the processing program so as to machine a workpiece by using the target portion for use of the milling cutter input at the inputting step;
outputting the processing program generated at the generating step to the machine tool;
provisionally updating the usage history information of the milling cutter assuming that the target portion for use of the milling cutter input at the inputting step has been used for machining the workpiece; and
finally updating the usage history information of the milling cutter based on measured values which express a state of use of the milling cutter and are output from the machine tool after machining of the workpiece is complete.

2. The processing program generation method of claim 1, further comprising a step of displaying the usage history information of each portion of the milling cutter acquired at the acquiring step.

3. The processing program generation method of claim 1, wherein the target portion for use of the milling cutter input at the inputting step is an unused portion of the milling cutter when precision machining the workpiece or an already used portion of the tool when rough machining the workpiece.

4. A processing program generation device for generating a processing program of a machine tool based on usage history information of a milling cutter which is attached to the machine tool, the device comprising:
- a tool database which acquires usage history information of each portion of the milling cutter and stores the information therein, the usage history information defining a used part of the milling cutter and being represented as a distance from a front end face of the milling cutter or a range of angles from an axial line of the milling cutter;
- a display which displays the usage history information of each portion of the milling cutter stored in the tool database;
- a CAM device configured to receive an input identifying a target portion for use of the milling cutter, which is input by referring to the usage history information displayed in the display; and configured to write the processing program by using the identified target portion for use of the milling cutter so as to machine a workpiece,
- wherein the tool database provisionally updates the usage history information of the milling cutter assuming that the target portion for use of the milling cutter input at the CAM device has been used for machining the workpiece, and then finally updates the usage history information of the milling cutter based on measured values which express a state of use of the milling cutter and are output from the machine tool after machining of the workpiece is complete.

5. The processing program generation device according to claim 4, wherein the tool database calculates a used portion of the milling cutter based on the measured values acquired from the machine tool and expressing a machining posture of the milling cutter, and also calculates a physical quantity expressing the state of use of the milling cutter linked with the used portion of the milling cutter and stores the physical quantity as the usage history information.

* * * * *